(12) United States Patent
Price, III et al.

(10) Patent No.: US 8,448,377 B1
(45) Date of Patent: May 28, 2013

(54) CLOSED-CIRCUIT PEST EXTERMINATION SYSTEM

(76) Inventors: Hampton Harold Price, III, Broken Arrow, OK (US); Mark Wayne Clark, II, Claremore, OK (US); Dmitriy N. Terekhov, Tulsa, OK (US)

( * ) Notice: Subject to any disclaimer, the term of this patent is extended or adjusted under 35 U.S.C. 154(b) by 668 days.

(21) Appl. No.: 12/118,414

(22) Filed: May 9, 2008

(51) Int. Cl.
*A01M 1/20* (2006.01)
*A01M 7/00* (2006.01)
*A01M 13/00* (2006.01)

(52) U.S. Cl.
USPC ............... 43/132.1; 43/124; 43/900; 239/69; 239/67

(58) Field of Classification Search
USPC ................ 43/124, 132.1, 900; 239/69, 67
See application file for complete search history.

(56) References Cited

U.S. PATENT DOCUMENTS

| | | | |
|---|---|---|---|
| 3,209,485 A * | 10/1965 | Griffin ............................ | 43/124 |
| 3,513,586 A * | 5/1970 | Gushue et al. .................. | 43/124 |
| 3,602,248 A * | 8/1971 | Peacock ......................... | 43/124 |
| 3,676,949 A * | 7/1972 | Ramsey .......................... | 43/124 |
| 3,782,026 A * | 1/1974 | Bridges et al. .................. | 43/124 |
| 3,793,762 A * | 2/1974 | Stains ............................. | 43/124 |
| 3,889,881 A * | 6/1975 | Cunningham et al. .......... | 239/70 |
| 3,979,063 A * | 9/1976 | Query ............................. | 239/70 |
| 4,028,841 A * | 6/1977 | Lundwall ........................ | 43/124 |
| 4,127,961 A | 12/1978 | Phillips | |
| 4,209,131 A * | 6/1980 | Barash et al. ................... | 239/69 |
| 4,637,547 A * | 1/1987 | Hiniker et al. .................. | 239/69 |
| 4,742,641 A * | 5/1988 | Cretti ............................. | 43/132.1 |
| 4,944,110 A * | 7/1990 | Sims .............................. | 43/124 |
| 4,989,363 A * | 2/1991 | Doernemann .................. | 43/132.1 |
| 5,007,197 A * | 4/1991 | Barbett .......................... | 43/124 |
| 5,063,706 A * | 11/1991 | Aki et al. ....................... | 43/124 |
| 5,231,796 A * | 8/1993 | Sims .............................. | 43/124 |
| 5,241,778 A * | 9/1993 | Price ............................. | 43/132.1 |
| 5,317,831 A * | 6/1994 | Fletscher ....................... | 43/124 |
| 5,343,652 A | 9/1994 | Johnson | |
| 5,347,749 A * | 9/1994 | Chitwood et al. ............. | 43/132.1 |
| 5,361,533 A | 11/1994 | Pepper | |
| 5,378,086 A * | 1/1995 | Campbell et al. .............. | 43/124 |
| 5,394,642 A * | 3/1995 | Takaoka ........................ | 43/124 |
| 5,641,463 A * | 6/1997 | Langhart ....................... | 43/124 |
| 5,815,090 A | 9/1998 | Su | |
| 5,876,665 A * | 3/1999 | Zalis ............................. | 43/132.1 |
| 6,047,495 A * | 4/2000 | Matsumura et al. ........... | 43/124 |

(Continued)

FOREIGN PATENT DOCUMENTS

| | | | |
|---|---|---|---|
| EP | 746978 A1 | * | 12/1996 |
| GB | 2074837 A | * | 11/1981 |
| JP | 2002300840 A | * | 10/2002 |

*Primary Examiner* — Darren W Ark

(74) *Attorney, Agent, or Firm* — Gable Gotwals

(57) ABSTRACT

A method and semi-permanent system for applying various pesticides within an interior space of a building structure includes a pipeline having a plurality of solenoid valves, each valve controlled by a microcontroller so that a predetermined amount of pesticide is distributed according to a predetermined, sequential timed firing sequence. The pipeline is installed external to an interior wall surface and may extend to areas far removed from the wall. A second pipeline supplies air to the solenoid valves and the microcontroller controls the flow of air to the valves so that an effective wet spray-cold aerosol fogging may be achieved. One or more sensors may be used to monitor the interior space of the building for purposes of safety. The entire system may be controlled through a computer interface, a network interface controller, a web-based interface, or a wireless device interface.

12 Claims, 2 Drawing Sheets

U.S. PATENT DOCUMENTS

Figure 1:
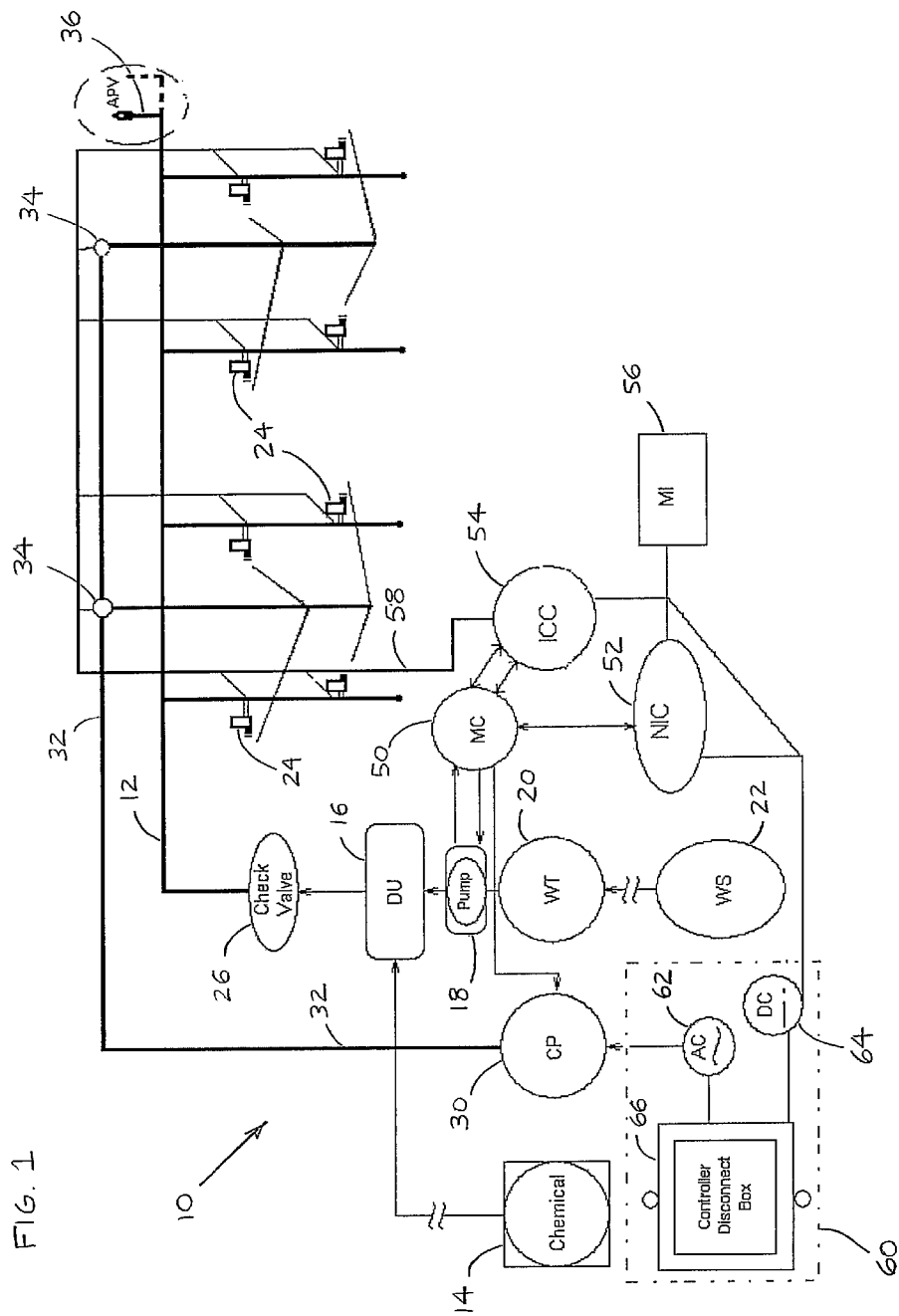
Figure 2:
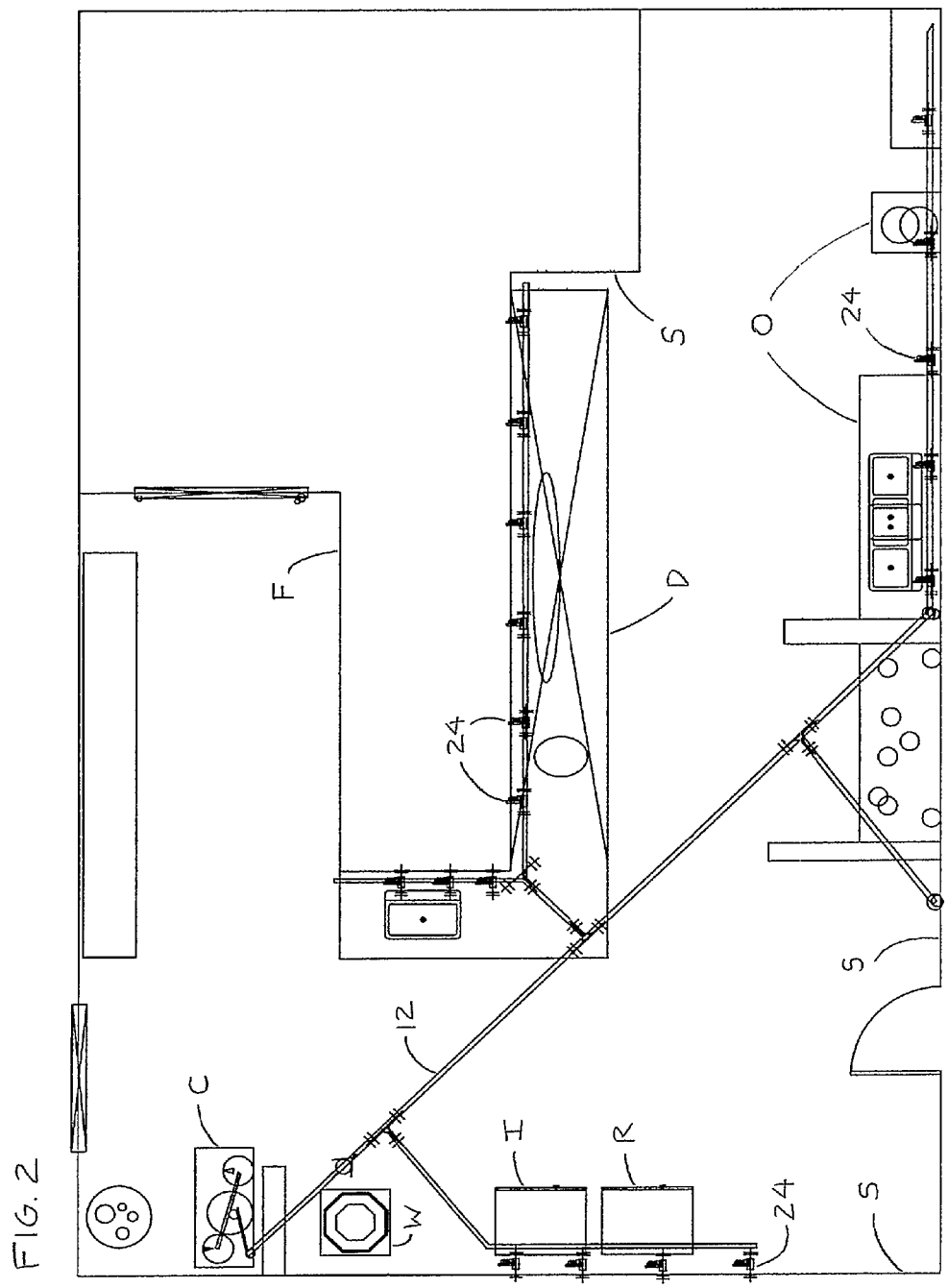

| | | | |
|---|---|---|---|
| 6,047,498 A * | 4/2000 | Mann | 43/132.1 |
| 6,272,790 B1 * | 8/2001 | Paganessi et al. | 43/132.1 |
| 6,397,518 B2 * | 6/2002 | Mann | 43/132.1 |
| 6,457,655 B1 * | 10/2002 | Reighard et al. | 239/69 |
| 6,467,216 B2 | 10/2002 | McManus et al. | |
| 6,564,504 B2 * | 5/2003 | Hoshall | 43/132.1 |
| 6,977,088 B2 | 12/2005 | Munzel et al. | |
| 7,032,346 B1 * | 4/2006 | Richard | 43/132.1 |
| 7,066,218 B1 | 6/2006 | Fleming et al. | 239/69 |
| 7,086,197 B1 * | 8/2006 | Gronewald | 43/132.1 |
| 7,295,898 B2 * | 11/2007 | Lovett et al. | 700/283 |
| 7,317,399 B2 | 1/2008 | Chyun | |
| 2004/0035949 A1 * | 2/2004 | Elkins et al. | 239/69 |
| 2005/0067511 A1 * | 3/2005 | Gray et al. | 239/67 |
| 2006/0086038 A1 * | 4/2006 | Mosher | 43/124 |
| 2006/0261188 A1 * | 11/2006 | Ito et al. | 43/132.1 |
| 2008/0055094 A1 | 3/2008 | Barber et al. | |
| 2009/0050705 A1 * | 2/2009 | Harrison, Jr. | 239/1 |
| 2010/0024280 A1 * | 2/2010 | Reed et al. | 43/132.1 |

* cited by examiner

CLOSED-CIRCUIT PEST EXTERMINATION SYSTEM

REFERENCE TO PENDING APPLICATIONS

This application is not based upon any pending domestic or international patent applications.

BACKGROUND OF THE INVENTION

This invention relates generally to pest control techniques and more specifically to techniques for the delivery of a pesticide to a designated point within an interior building structure via remote means. Prior art distribution techniques involve the use of a tube or pipe contained within the wall of the building structure to deliver pesticide through openings in the pipe or through nozzles connected to the pipe. See U.S. Pat. Nos. 4,028,841; 4,742,641; & 4,944,110. A timing device may be connected to the system to automatically and periodically deliver the pesticide by activating a pump that pumps the pesticide through the pipe and out of the openings or nozzles. Alternatively, a pressurized container may be employed to distribute the pesticide. To clean the pipe after use, an inert gas such as nitrogen may be used to expel any undistributed pesticide from the lines.

The prior art distribution techniques have several disadvantages. All the techniques require permanent plumbing and, therefore, cannot deliver pesticide to spaces external to or remotely removed from an interior wall, nor can the distribution systems be easily reconfigured. Additionally, blocked openings or malfunctioning nozzles are difficult to detect and service. More importantly, none of the techniques provide for precise control of the amount of pesticide being delivered through any one opening or nozzle, nor can these techniques vary the amount of pesticide delivered by adjacent nozzles or bypass one or more nozzles. Additionally, none of these techniques are capable of providing a wet spray followed by cold aerosol fogging, which is an effective method for eliminating pests such as cockroaches.

Because of the above disadvantages, customers with pest control needs and the pesticide industry have not widely adopted these techniques, preferring instead to rely upon a technician to physically deliver the pesticide or set baited devices. This holds true even when sophisticated remote monitoring systems for pest control are employed. See e.g., U.S. Pat. No. 7,317,399 & U.S. Pub. No. 2008/0055094. Therefore, a need exists for a distribution system that can deliver a pesticide to a remote interior space of a building structure, precisely control the amount of pesticide delivered to any point in that space, and be easily reconfigurable in accordance with changing pest management needs and building layouts.

BRIEF SUMMARY OF THE INVENTION

A method and system for applying various pesticides within an interior space of a building structure includes a semi-permanent pipeline in communication with a pesticide source. The pesticide is introduced to the pipeline through a diluter unit that mixes the pesticide with water to deliver a desired concentration of the pesticide. Located at various places along the pipeline are solenoid valves. A microcontroller controls the operation of each solenoid valve so that a predetermined amount of pesticide is distributed by each solenoid valve according to a predetermined firing sequence.

The spray pattern and direction of spray of the each solenoid valve should be selected to deliver pesticide in such a way as to provide effective coverage of the desired location. The spacing of the solenoid valves along the pipeline or along any branch of the pipeline may be fixed or variable, depending on the specific requirements of the pest management application. Additionally, the orientation of any given solenoid valve may vary from other adjacent valves and may be changed. The predetermined firing sequence preferably is a sequential timed sequence in which only one solenoid valve is open at any given time. The closing of one solenoid valve and the opening of the next adjacent solenoid valve preferably occurs almost simultaneously so that the practical effect is to provide almost instantaneous delivery of pesticide through all the valves.

A network interface controller and monitor interface may be used in combination with the microcontroller to provide remote monitoring and control of the system. A motion detector sensor or other types of sensors may also be used in combination with the system so that the solenoid valves do not fire when a person is present in the area or when other potentially unsafe environmental conditions are present.

An air compressor and an air line equipped with air solenoid valves may also be employed. The microcontroller controls each air solenoid valve so that a predetermined amount of air flows to the pipeline solenoid valves at a predetermined time. By delivering air in this manner to each pipeline solenoid valve, a cold aerosol fogging effect may be achieved in addition to a wet spray application. An air purge valve may be provided at the highest elevation of the pipeline.

The system is preferably reconfigurable as pest management needs change or as the building structure and layout change. The pipeline and air line are preferably installed in close proximity to one another and external to an interior wall surface. The lines are then routed so that the pipeline solenoid valves are positioned in places where pests are likely to nest and scavenge for food. The lines may also be routed through ceiling access spaces when appropriate in order to span the distance between various locations within the structure or between those locations and the pesticide source. A better understanding of the invention will be obtained from the following detailed description of the preferred embodiments taken in conjunction with the drawings and the claims.

BRIEF DESCRIPTION OF THE DRAWINGS

FIG. 1 is a schematic diagram of a semi-permanent distribution system for applying various pesticides within an interior space of a building structure. A diluter unit supplies a pipeline with a pesticide and a microcontroller controls the opening and closing of solenoid valves along the pipeline so that a predetermined amount of pesticide is distributed through each solenoid valve. An air compressor supplies air to a second line in communication with the microcontroller and the solenoid valves so that a cold aerosol fogging effect may be achieved.

FIG. 2 is a floor plan of a commercial kitchen illustrating a layout of the distribution system at various places throughout the interior space of the kitchen. The pipeline is routed to areas where pests are likely to nest and scavenge for food. Each solenoid valve is oriented and spaced appropriately along the pipeline and delivers a predetermined amount of pesticide to a specific area.

DETAILED DESCRIPTION OF THE PREFERRED EMBODIMENTS

Referring to FIG. 1, a semi-permanent system 10 for applying various pesticides within an interior space of a building structure includes a pipeline 12 in communication with a pesticide source 14. Pipeline 12 is preferably constructed from PVC material or a flexible tubing material may be used. Pesticide 14 is preferably a natural pesticide but system 10 may accommodate other types of pesticides as well.

Pesticide 14 is introduced to pipeline 12 through a diluter unit 16. Diluter unit 16 mixes pesticide 14 with water provided by pump 18 to deliver a desired concentration of pesticide 14 to pipeline 12. In a preferred embodiment, a Dosmatic A10 diluter, manufactured by Dosmatic U.S.A., Inc., provided an adequate diluter unit 16. A check valve 26 ensures that pesticide 14 does not backflow into diluter 16 and contaminate optional water tank 20 or water supply 22.

Located at various places along pipeline 12, and along various branches of pipeline 12, are one or more pipeline solenoid valves 24. Valve 24 preferably includes an integrated nozzle but may also be used in combination with a separate nozzle unit. A microcontroller 50 controls the operation of each valve 24 so that a predetermined amount of pesticide 14 is distributed by each valve 24 according to a predetermined firing sequence. A wiring harness 58 connects an integrated circuit controller 54 to valves 24. Wiring harness 58 may include quick connects that allow for easy assembly to a maintenance cart (not shown). Additional integrated circuits (not shown) may be used to expand the number of valves 24 being controlled by microcontroller 50.

The spray pattern and direction of spray of each valve 24 are selected to deliver pesticide 14 in such a way as to provide effective coverage of a desired location. The predetermined firing sequence preferably is a sequential timed sequence in which only one valve 24 is open at any given time. The amount of time each valve is opened depends on customer and pest management requirements. Preferably, the closing of one valve 24 and the opening of the next adjacent valve 24 occurs almost simultaneously. In this manner, a controlled amount of pesticide 14 may be delivered through each valve 24 yet the practical effect is almost instantaneous delivery of pesticide 14 through all the valves 24. Alternatively, the amount of time may be set so that any adjacent valve 24 distributes a different amount of pesticide 14. The predetermined firing sequence may also be set so that adjacent valves 24 fire at different times throughout the day or that only certain valves 24 along certain portions of pipeline 12 fire. The possible firing sequences are limited only by the limitations of microcontroller 50.

In another preferred embodiment, a network interface controller 52 and a monitor interface 56 provide remote monitoring and control of system 10. A motion detector sensor (not shown) may also be used in combination with system 10 to ensure that system 10 does not fire the valves 24 when a person is present in the area. Other sensors that monitor the environment of the building structure, including the condition of system 10, may be employed for safety purposes. These sensors include but are not limited to a temperature sensor (not shown), a flow sensor (not shown), a pressure sensor (not shown) a gas or carbon monoxide sensor (not shown), an alarm sensor (not shown), and a fire alarm particulate matter sensor (not shown). For example, in many commercial building structures an alarm is set as the last employee leaves the building. System 10 may monitor whether the alarm has been set before initiating the predetermined firing sequence. Because almost all of the building structures within which system 10 will be employed include smoke detection and fire suppression systems, pesticide 14 may register as a smoke or fire particulate by these devices. A fire alarm particulate matter sensor, therefore, would provide a check on these devices and help minimize the potential for false alarms.

In yet another preferred embodiment of system 10, an air line 32 is provided. A compressor 30 provides high pressure or low pressure air to air line 32 and a number of air solenoid valves 34 control the flow of air to pipeline valves 24. Microcontroller 50 controls each air solenoid valve 34 so that a predetermined amount of air flows to each valve 24 at a predetermined time. By delivering air in a controlled manner to each valve 24, a cold aerosol fogging effect may be achieved. In yet another preferred embodiment, an effective wet spray-cold aerosol fogging combination is achieved by opening and closing four solenoid valves 24 in sequence and then simultaneously opening air solenoid valve 34 and the valves 24. Other effective wet spray-cold aerosol fogging combinations are possible and depend upon the specific requirements of the pest management application. An air purge valve 36 may be provided at the highest elevation of pipeline 12.

Referring now to FIG. 2, system 10 is preferably a semi-permanent installation that is easily reconfigurable as pest management needs change or as the building structure or layout changes. In a preferred embodiment, VELCRO® brand fasteners are used to attach pipeline 12 to a vinyl wall surface S. Other types of fasteners may be used; the fasteners are not a unique feature of system 10. Air line 32 may also be attached to surface S or to pipeline 12. Although air line 32 and solenoid valves 34 are not shown in FIG. 2 for the sake of figure clarity, a person of ordinary skill would understand how to route line 32 and valves 34 to work in combination with pipeline 12 and valves 24 as described herein.

Lines 12 and 32 (not shown) are preferably routed along the exterior of interior wall surfaces S or along walls formed by equipment such as a walk-in freezer F so that solenoid valves 24 are positioned in places and at heights where pests are likely to nest and scavenge for food. For example, solenoid valves 24 are positioned at about floor level and behind a dishwasher D, ice maker I, and refrigerator R. Other valves 24 are positioned similarly at other work stations O. The spacing of the valves 24 and 34 (not shown) may be fixed or variable, depending on the specific requirements of the pest management application. Additionally, the orientation of valves 24 may vary from one another and the valves 24 may protrude into interior spaces of the wall in order to deliver pesticide 14 to those interior spaces. Lines 12 and 32 (not shown) may be routed through ceiling access spaces when appropriate in order to safely span open floor spaces. Pesticide source 14, diluter 16, pump 18, water tank 20, and air compressor 30 may reside in a maintenance closet C.

While system 10 has been described with a certain degree of particularity, many changes may be made in the details of its construction and the arrangement of its components without departing from the spirit and scope of this disclosure. Therefore, a system 10 according to this disclosure is limited only by the scope of the attached claims, including the full range of equivalency to which each claim element is entitled.

What is claimed is:

1. A semi-permanent distribution system for applying various pesticides within an interior space of a building structure comprising:

a first pipeline having a plurality of solenoid valves located along a length of the first pipeline, the first pipeline being in communication with a pesticide source and a pump and receiving a volume of pesticide from the pesticide source;

each solenoid valve of the plurality of solenoid valves having a nozzle;

a microcontroller in communication with each solenoid valve of the plurality of solenoid valves; and a second pipeline in communication with a compressed air source and at least one of the solenoid valves of the plurality of solenoid valves;

the microcontroller controlling each solenoid valve of the plurality of solenoid valves so that a predetermined amount of pesticide is distributed by each solenoid valve through its corresponding nozzle according to a predetermined firing sequence;

the predetermined amount of pesticide being distributed by the corresponding nozzle of any solenoid valve of the plurality of solenoid valves being independent of the predetermined amount of pesticide being distributed by any other corresponding nozzle of another solenoid valve of the plurality of solenoid valves;

the microcontroller also controlling a predetermined amount of air flow to the at least one solenoid valve of the plurality of solenoid valves in communication with the second pipeline;

the predetermined amount of air flow and the predetermined amount of pesticide capable of being delivered through the at least one solenoid valve of the plurality of solenoid valves at a same time;

the first and second pipelines being temporarily externally attached to an interior wall surface of the building structure.

2. A system according to claim 1 further comprising only one solenoid valve of the plurality of solenoid valves being open at any given time during the predetermined firing sequence.

3. A system according to claim 2 further comprising the predetermined firing sequence being a sequential timed sequence.

4. A system according to claim 1 wherein the predetermined amount of pesticide distributed by any adjacent solenoid valves of the plurality of solenoid valves is a substantially equal amount.

5. A system according to claim 1 wherein the predetermined amount of pesticide distributed by any adjacent solenoid valves of the plurality of solenoid valves is a substantially different amount.

6. A system according to claim 1 further comprising at least one air purge valve being in communication with the first pipeline and located at a highest elevation of the first pipeline.

7. A system according to claim 1 further comprising a sensor in communication with the microcontroller, the sensor detecting a state of the interior space of the building structure for purposes of safety.

8. A system according to claim 7 further comprising the sensor being at least one sensor selected from the group consisting of an alarm sensor, a camera, a fire alarm particulate sensor, a flow sensor, a gas sensor, a humidity sensor, a motion detection sensor, a photoelectric sensor, a pressure sensor, a sound sensor, and a temperature sensor.

9. A system according to claim 1 further comprising an interface in communication with the microcontroller, the interface being at least one interface selected from the group consisting of a computer interface, a network interface controller, a web-based interface, and a wireless device interface.

10. A system according to claim 1 further comprising an integrated circuit in communication with the microcontroller and the at least one solenoid valve.

11. A system according to claim 1 further comprising a diluter in communication with a water supply and the pesticide source.

12. A system according to claim 1 further comprising only one solenoid valve of the plurality of solenoid valves being open at any given time, an adjacent solenoid valve of the plurality of solenoid valves being opened substantially instantaneously upon the closing of the opened one solenoid valve, the opening and closing substantially instantaneously delivering a substantially equal amount of pesticide through each solenoid valve in the plurality of solenoid valves.

* * * * *